US008063923B2

(12) United States Patent
Lilleness et al.

(10) Patent No.: US 8,063,923 B2
(45) Date of Patent: Nov. 22, 2011

(54) SYSTEM AND METHOD FOR UPDATING INFORMATION IN AN ELECTRONIC PORTABLE DEVICE

(75) Inventors: Robert P. Lilleness, Newport Beach, CA (US); Steve LanPing Huang, Placentia, CA (US); Patrick H. Hayes, Mission Viejo, CA (US)

(73) Assignee: Universal Electronics Inc., Cypress, CA (US)

( * ) Notice: Subject to any disclaimer, the term of this patent is extended or adjusted under 35 U.S.C. 154(b) by 1603 days.

(21) Appl. No.: 10/287,337

(22) Filed: Nov. 4, 2002

(65) Prior Publication Data

US 2003/0048295 A1    Mar. 13, 2003

Related U.S. Application Data

(63) Continuation-in-part of application No. 09/905,396, filed on Jul. 13, 2001, now Pat. No. 6,938,101.

(60) Provisional application No. 60/334,774, filed on Nov. 20, 2001, provisional application No. 60/344,020, filed on Dec. 20, 2001, provisional application No. 60/378,902, filed on May 8, 2002, provisional application No. 60/390,286, filed on Jun. 20, 2002.

(51) Int. Cl.
*G09G 5/00*    (2006.01)

(52) U.S. Cl. ...................................... 345/738

(58) Field of Classification Search ............ 715/721; 348/734; 725/32, 35–78; 345/778, 156, 345/811, 158

See application file for complete search history.

(56) References Cited

U.S. PATENT DOCUMENTS

| | | | |
|---|---|---|---|
| 4,894,789 A | 1/1990 | Yee | |
| 5,005,084 A | 4/1991 | Skinner | |
| 5,260,778 A * | 11/1993 | Kauffman et al. | 725/33 |
| 5,293,357 A | 3/1994 | Hallenbeck | |
| 5,307,055 A | 4/1994 | Baskin et al. | |
| 5,410,326 A | 4/1995 | Goldstein | |
| 5,565,888 A | 10/1996 | Selker | |
| 5,574,964 A | 11/1996 | Hamlin | |
| 5,635,989 A | 6/1997 | Rothmuller | |
| 5,648,760 A | 7/1997 | Kumar | |
| 5,652,613 A | 7/1997 | Lazarus et al. | |
| 5,671,267 A | 9/1997 | August et al. | |
| 5,710,605 A | 1/1998 | Nelson | |
| 5,724,106 A | 3/1998 | Autry et al. | |
| 5,751,372 A | 5/1998 | Forson | |
| 5,761,606 A | 6/1998 | Wolzien | |
| 5,793,438 A | 8/1998 | Bedard | |
| 5,801,787 A | 9/1998 | Schein et al. | |

(Continued)

FOREIGN PATENT DOCUMENTS

EP    0561435 A2    9/1993

(Continued)

OTHER PUBLICATIONS

PRONTO User Guide, Universal Electronics Inc., 1999, pp. 1-56.

*Primary Examiner* — Tammy Pham
(74) *Attorney, Agent, or Firm* — Greenberg Traurig, LLP

(57) ABSTRACT

A Web server by which a user can request that reminder data, movie guide data, and/or TV guide data be downloaded to a portable electronic device.

9 Claims, 18 Drawing Sheets

U.S. PATENT DOCUMENTS

| | | | |
|---|---|---|---|
| 5,828,419 A | 10/1998 | Bruette et al. | |
| 5,835,864 A | 11/1998 | Diehl et al. | |
| 5,838,775 A | 11/1998 | Montalbano | |
| 5,855,006 A | 12/1998 | Huemoeller et al. | |
| 5,900,875 A | 5/1999 | Haitani et al. | |
| 5,901,366 A | 5/1999 | Nakano et al. | |
| 5,915,026 A | 6/1999 | Mankovitz | |
| 5,940,073 A * | 8/1999 | Klosterman et al. | 715/721 |
| 5,956,025 A | 9/1999 | Goulden et al. | |
| 5,970,206 A | 10/1999 | Yuen et al. | |
| 5,974,222 A | 10/1999 | Yuen et al. | |
| 6,002,394 A | 12/1999 | Schein et al. | |
| 6,002,450 A | 12/1999 | Darbee et al. | |
| 6,018,372 A | 1/2000 | Etheredge | |
| 6,020,881 A | 2/2000 | Naughton et al. | |
| 6,028,599 A | 2/2000 | Yuen et al. | |
| 6,040,829 A | 3/2000 | Croy et al. | |
| 6,097,441 A | 8/2000 | Allport | |
| 6,104,334 A | 8/2000 | Allport | |
| 6,127,941 A | 10/2000 | Van Ryzin | |
| 6,130,726 A | 10/2000 | Darbee et al. | |
| 6,133,909 A | 10/2000 | Schein et al. | |
| 6,137,549 A | 10/2000 | Rasson et al. | |
| 6,151,059 A | 11/2000 | Schein et al. | |
| 6,172,674 B1 | 1/2001 | Etheredge | |
| 6,177,931 B1 * | 1/2001 | Alexander et al. | 725/52 |
| 6,195,589 B1 | 2/2001 | Ketcham | |
| 6,211,856 B1 | 4/2001 | Choi et al. | |
| 6,219,694 B1 | 4/2001 | Lazaridis et al. | |
| 6,256,019 B1 | 7/2001 | Allport | |
| 6,278,499 B1 | 8/2001 | Darbee et al. | |
| 6,285,357 B1 | 9/2001 | Kushiro et al. | |
| 6,341,374 B2 | 1/2002 | Schein et al. | |
| 6,369,840 B1 | 4/2002 | Barnett et al. | |
| 6,408,435 B1 | 6/2002 | Sato | |
| 6,437,836 B1 * | 8/2002 | Huang et al. | 348/734 |
| 6,463,463 B1 | 10/2002 | Godfrey et al. | |
| 6,532,589 B1 | 3/2003 | Proehl et al. | |
| 6,577,350 B1 | 6/2003 | Proehl et al. | |
| 6,799,327 B1 * | 9/2004 | Reynolds et al. | 725/42 |
| 6,912,517 B2 * | 6/2005 | Agnihotri et al. | 706/45 |
| 6,915,528 B1 * | 7/2005 | McKenna, Jr. | 725/37 |
| 6,965,415 B2 * | 11/2005 | Lundblad et al. | 348/556 |
| 2001/0013125 A1 | 8/2001 | Kitsukawa et al. | |
| 2001/0054180 A1 | 12/2001 | Atkinson | |
| 2002/0035726 A1 * | 3/2002 | Corl | |
| 2002/0053084 A1 * | 5/2002 | Escobar et al. | 725/47 |
| 2002/0056112 A1 * | 5/2002 | Dureau et al. | 725/78 |
| 2002/0057678 A1 * | 5/2002 | Jiang et al. | 370/353 |
| 2002/0173344 A1 | 11/2002 | Cupps et al. | 455/566 |
| 2002/0194081 A1 * | 12/2002 | Perkowski | 705/26 |
| 2003/0005440 A1 * | 1/2003 | Axelsson et al. | 725/39 |
| 2005/0028208 A1 * | 2/2005 | Ellis et al. | 725/58 |

FOREIGN PATENT DOCUMENTS

| | | |
|---|---|---|
| EP | 0967797 A2 | 12/1999 |
| EP | 0987888 A1 | 3/2000 |
| EP | 1197889 A1 | 4/2002 |
| EP | 1204275 A2 | 5/2002 |
| GB | 2343073 A | 4/2000 |
| WO | WO 00/40016 | 7/2000 |
| WO | WO 00/58935 | 10/2000 |
| WO | 00/78050 A | 12/2000 |
| WO | WO 01/20572 A1 | 3/2001 |
| WO | 01/37155 A1 | 5/2001 |

* cited by examiner

SYSTEM AND METHOD FOR UPDATING INFORMATION IN AN ELECTRONIC PORTABLE DEVICE

RELATED APPLICATION INFORMATION

This application claims the benefit of U.S. Provisional Patent Application Nos. 60/344,020, filed on Dec. 20, 2001, 60/378,902, filed on May 8, 2002, and 60/390,286, filed on Jun. 20, 2002.

This application also claims the benefit of and is a continuation-in-part of U.S. patent application Ser. No. 09/905,396.

All of these applications are hereby incorporated by reference in their entirety.

BACKGROUND OF THE INVENTION

This invention generally relates to electronic portable devices having a display and communication capabilities. Exemplary devices include personal digital assistants ("PDAs"), Web Tablets, touch screen remote controls, lap-top computers, and the like.

SUMMARY OF THE INVENTION

In accordance with the description that follows, a system and method is provided for updating information, such as guide data, personal calendar data, etc., in a portable electronic device. An understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
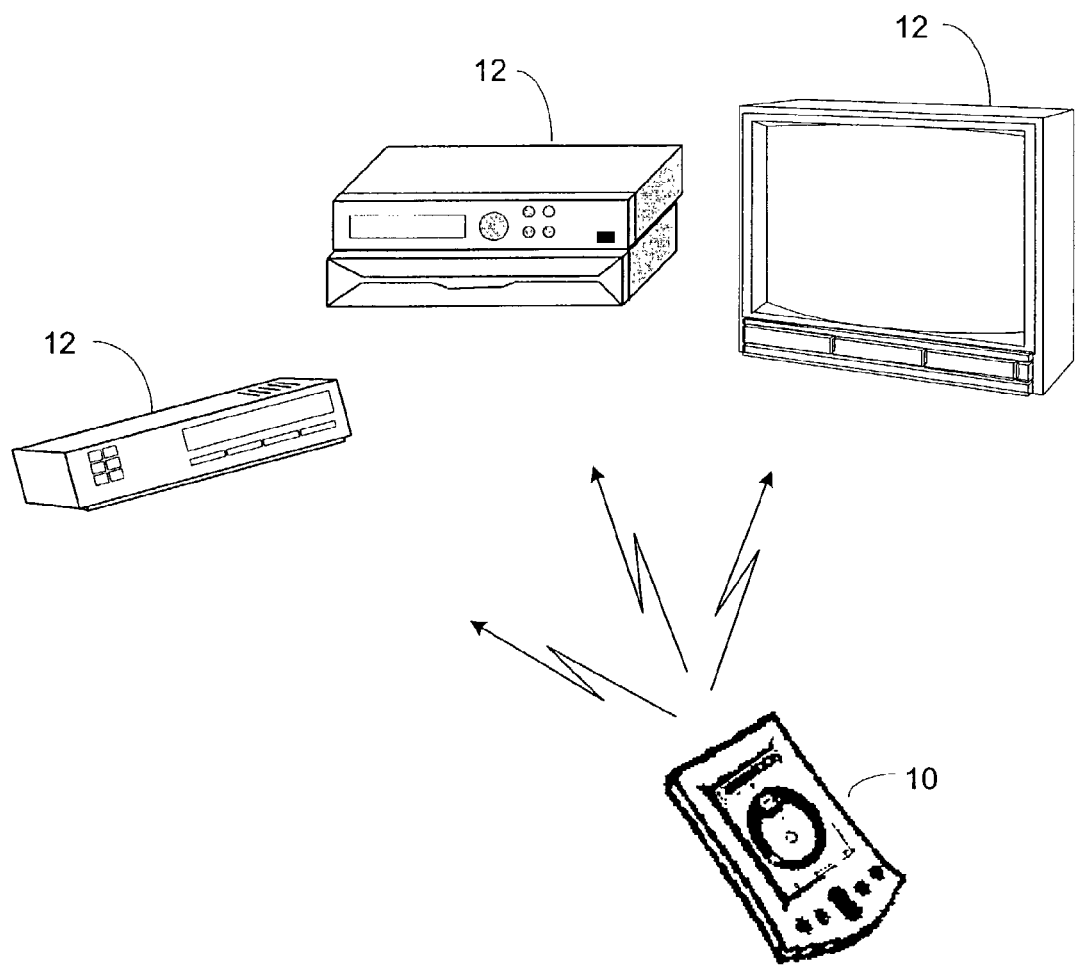
FIG. 1 illustrates an exemplary portable device having a remote control application for use in controlling the operation of home appliances.

A universal remote control application is provided as an application which may run on a portable electronic device 10. By way of example, representative platforms for the device 10 include, but are not limited to, devices such as remote controls, lap-top computers, Web Tablets and/or PDAs manufactured by HP/Compaq (such as the iPAQ brand PDA), Palm, Visor, Sony, etc. Thus, a preferred underlying platform includes a processor coupled to a memory system comprising a combination of ROM memory, non-volatile read/write memory, and RAM memory (a memory system); a key matrix in the form of physical buttons; an internal clock and timer; a transmission circuit; a power supply; a touch screen display to provide visible feedback to and accept input from a consumer; and I/O circuitry for allowing the device to exchange communications with an external computer such as server and/or client. Additional input circuitry, such as a barcode reader, may also be utilized.

To control the operation of the device 10, the memory system includes executable instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The non-volatile read/write memory, which may be FLASH, EEPROM, battery-backed up RAM, "Smart Card," memory stick, or the like, is preferably provided to store consumer entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system comprises all three classes of memory, it will be appreciated that, in general, the memory system can be comprised of any type of computer-readable media, such as ROM, RAM, SRAM, FLASH, EEPROM, or the like in combination. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of the remote control application for the purpose of controlling the operation of an appliance. The memory system may also includes instructions which the processor uses in connection with the transmission circuit to cause the command codes to be transmitted in a format recognized by an identified appliance. While the transmission circuit preferably utilizes infrared transmissions, it will be appreciated that other forms of wired or wireless transmissions, such as radio frequency, may also be used.

To identify appliances by type and make (and sometimes model) such that the remote control application of the device 16 is adapted to cause the transmission of command codes in the format appropriate for such identified appliances, information may be entered into the device 10. Since methods for setting up a remote control application to cause the transmissions of commands to control the operation of specific appliances are well-known, they will not be described in greater detail herein. Nevertheless, for additional details pertaining to remote control application setup, the reader may turn to U.S. Pat. Nos. 6,225,938, 4,623,887, 5,872,562, 5,614,906, 4,959, 810, 4,774,511, and 4,703,359 which are incorporated herein by reference in their entirety. It should also be appreciated that these set-up methods may be used to configure a personal computer to communicate with a home appliance, for example, if the personal computer is anticipated to use wireless communications to command the operation of appliances in a home entertainment network such as described below.

To cause the device 10 to perform an action, the device 10 is adapted to be responsive to events, such as a sensed consumer interaction with one or more keys on the key matrix, a sensed consumer interaction with the touch screen display, or a sensed signal from an external source such as a remote computer. In response to an event, appropriate instructions within the memory system are executed. For example, when a hard or soft command key associated with the remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote control application include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the platform of the device 10 preferably comprises a general purpose, processor system which is controllable by software. The software may include routines, programs, objects, components, and/or data structures that perform particular tasks that can be viewed as an operating system together with one or more applications. The operating system, such as the "Windows CE" brand operating system or the like, provides an underlying set of management and control functions which are utilized by applications to offer the consumer functions such as calendar, address book, spreadsheet, notepad, Internet browsing, etc., as well as control of appliances. Thus, it is to be understood that applications in addition to or complimentary with the remote control application can also be supported by the device 10 and, as such, in terms of the internal software architecture, the "remote control" application may be but one of several possible applications which may co-exist within the device 10.

In terms of providing operating system functionality, it should also be understood that the demarcation between the portable device 10 and a host/client computer, described in greater detail hereinafter, may vary considerably from product to product. For example, at one extreme the portable device 10 may be nothing more than a slave display and input device in wireless communication with a computer that performs all computational functions. At the other extreme, the portable device 10 may be a fully-functional computer system in its own right complete with local mass storage. It is also to be appreciated that a hardware platform similar to that described above may be used in conjunction with a scaled-down operating system to provide remote control functionality only, i.e., as a standalone application. In all cases, however, the principles expressed herein remain the same.

To provide a means by which an consumer can interact with the device 10, the device 10 is preferably provided with software that implements a graphical user interface. The graphical user interface software may also provide access to additional software, such as a browser application, that is used to display information that may be received from an external computer. Such a graphical user interface system is described in pending U.S. Applications 60/264,767, 60/334, 774, and 60/344,020 all of which are incorporated herein by reference in their entirety.

Figure 2:
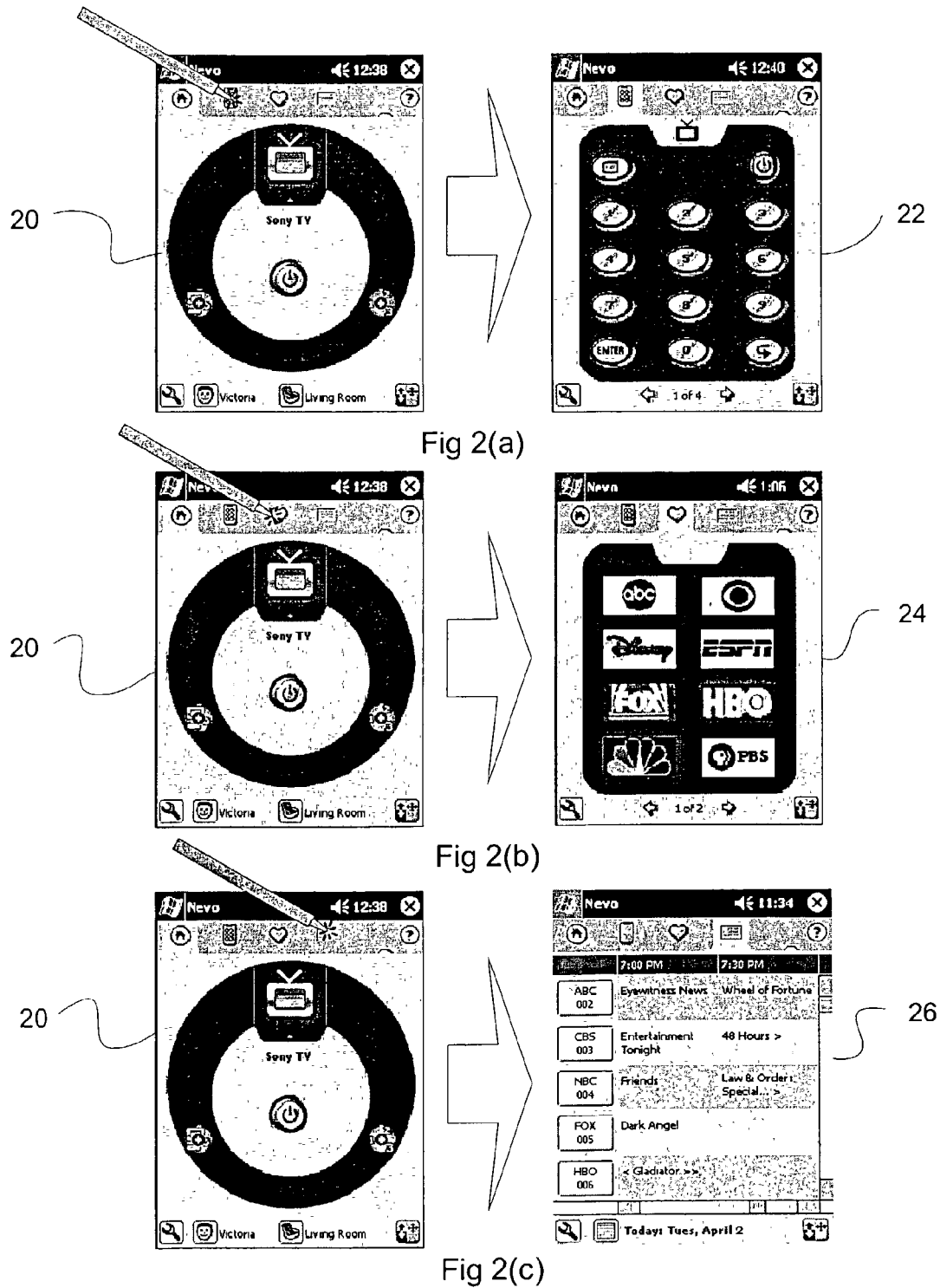
FIG. 2 illustrates exemplary screen shots of a graphical user interface of the portable device of FIG. 1.
Figure 3:
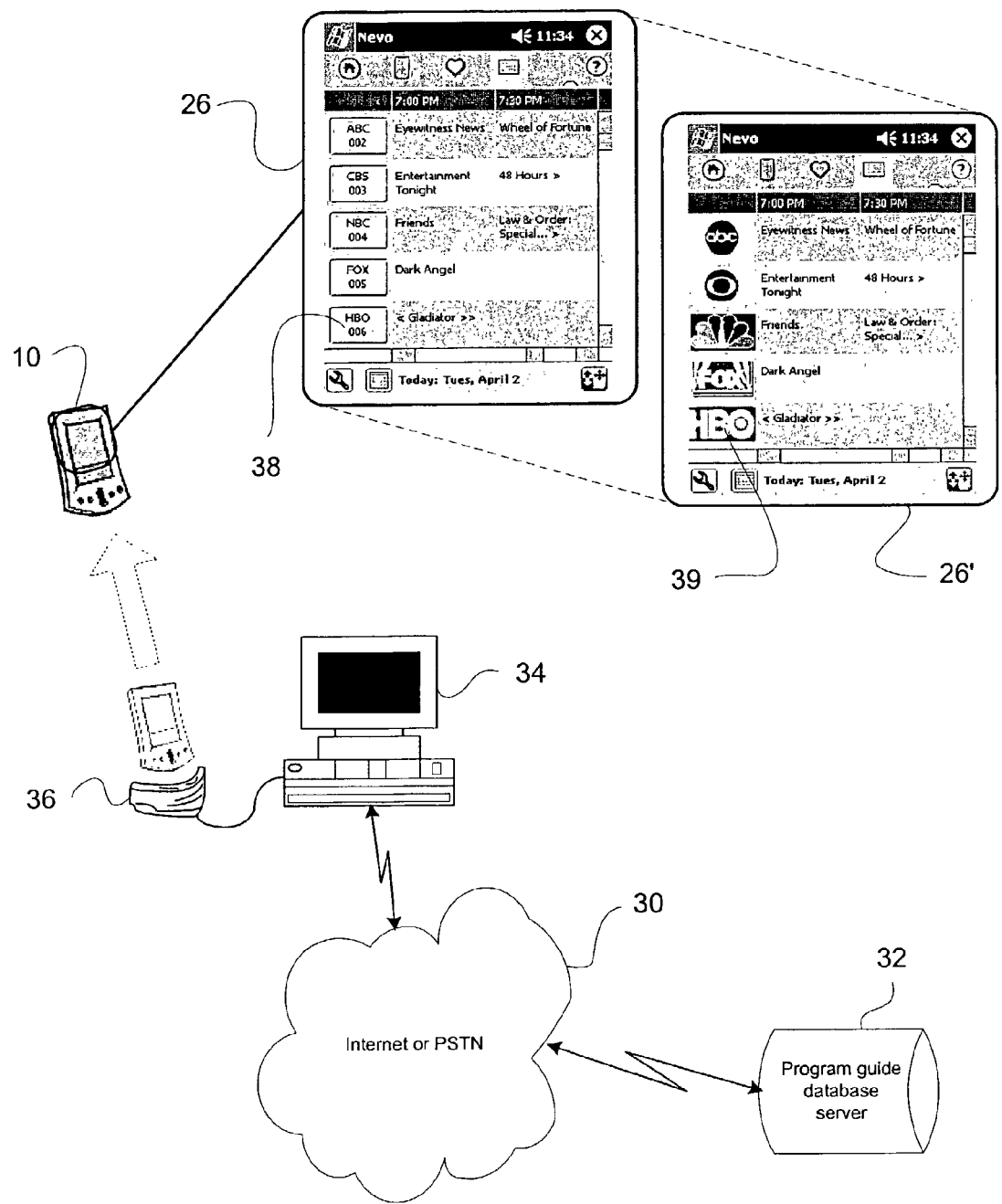
FIG. 3 illustrates an exemplary network by which program guide information is downloadable to the portable device of FIG. 1.

For controlling the operation of one or more consumer appliances 12, as illustrated in FIG. 1, the universal remote control application includes a remote control application. Features offered by the remote control application may include a "home page" 20 from which the user may select various functionalities such as, for example, a device control panel 22, a "Favorites" page 24 (which allows direct tuning to favorite program channels by logo/name), a program guide display 26, etc. as illustrated in FIG. 2. While not intended to be limiting, the program guide may be arranged in a grid having a plurality of cells in which programming information is contained where the cells are arranged in rows corresponding to content providers and columns corresponding to times of day. The program guide display 26 row indicators may be formatted using channel names and/or numbers 38, as illustrated in FIG. 2, or channel logos 39, as illustrated in FIG. 3, to identify soft keys or hard keys (collectively referred to as "buttons") which the consumer may activate in order to have the device 10 transmit the appropriate remote control command(s) to cause an appliance to tune to a channel corresponding to the labeled button. If used, the channel logo graphics may be included as part of downloaded program guide data, as will be described hereinafter, or the graphics may be linked to and derived from the favorite channel display page(s) 24. It will also be appreciated that the program guide display 26 may be arranged in numerical or alphabetical sequence by channel, by favorite channel (in the same sequence as they appear in a favorite channels page 24), by program type or genre, etc.

Data for the program guide display 26 may be obtained over the Internet 30 from a program guide database server 32 using a personal computer 34 and docking station 36 as illustrated in FIG. 3. In such a system, the device 10 is periodically docked with the docking station 36 for file synchronization purposes. Since software for providing such synchronization functionality, e.g., Microsoft's ActiveSync brand synchronization software, is well known and widely used in PDA applications, this functionality will not be discussed in further detail herein.

Figure 4:
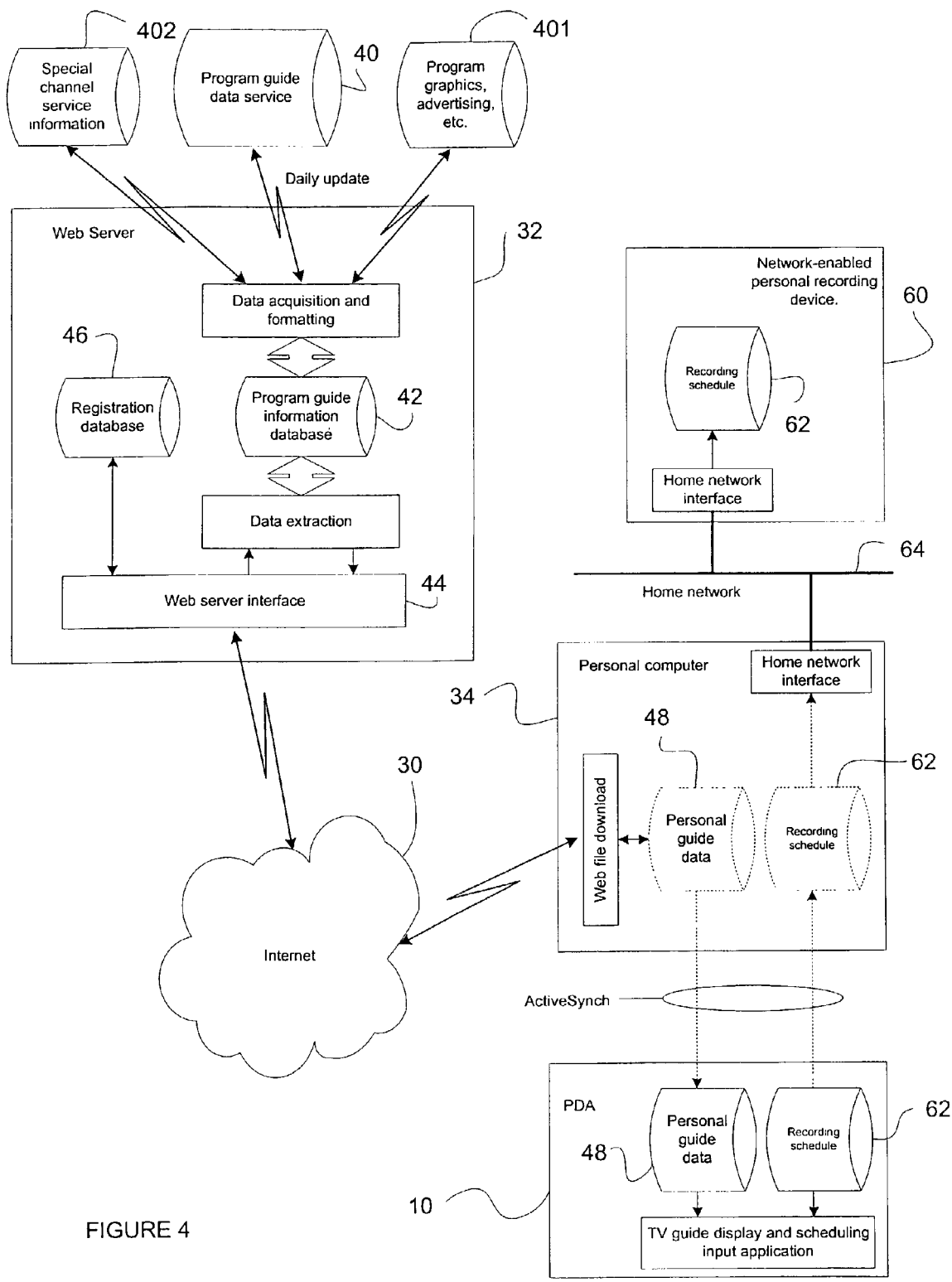
FIG. 4 illustrates a more detailed view of the network illustrated in FIG. 3.

To acquire guide data for use in connection with the remote control application, an exemplary guide data acquisition process is illustrated in FIG. 4. As illustrated, raw program guide data 40 is generally available by subscription from entities such as, for example, Tribune Media Services ("TMS"). A program guide data server 32 is normally configured to access the TMS data on a periodic basis, typically once every 24 hours, after TMS's nightly update is complete. The raw guide data obtained from TMS may then be formatted and stored into a local database 42 associated with the Web server 32. Additional data, such as graphics 401, which may be associated with program descriptions, special service information, and/or advertising 402 (e.g., pay-per view), etc. may also be obtained from third-party sources and combined into the database 42 for later delivery to system users. It should also be appreciated that, while the illustrated examples are in the context of a TV program database sourced from TMS, in practice the programming information stored in the server database 42 may be obtained from several different sources and may span more than one type of programming, for example, radio broadcast information, Webcasts, etc. in addition to or as a substitute for TV schedule information.

Figure 12:
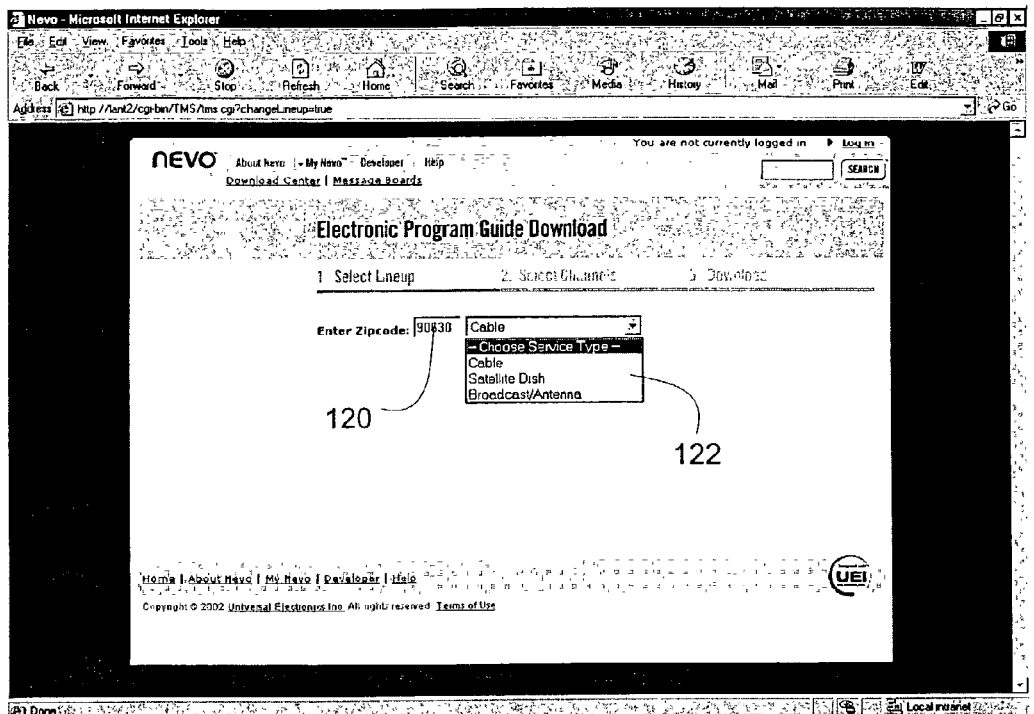
FIGS. 12-14 illustrate exemplary registration screens by which the consumer can specify preferences for a downloaded program guide.
Figure 13:
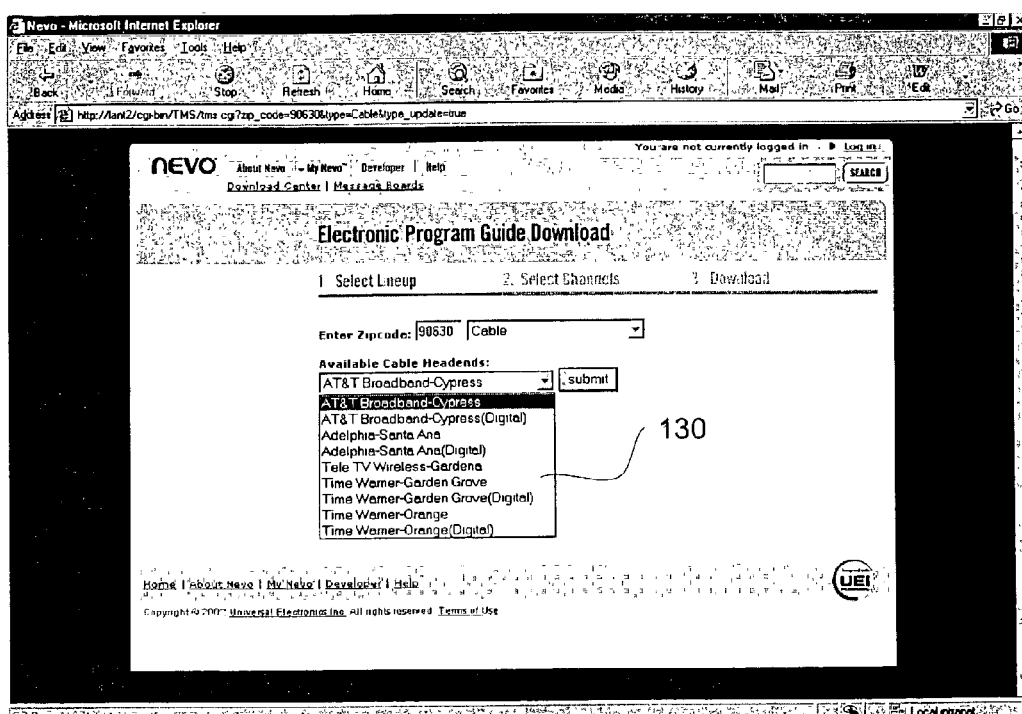
Figure 14:
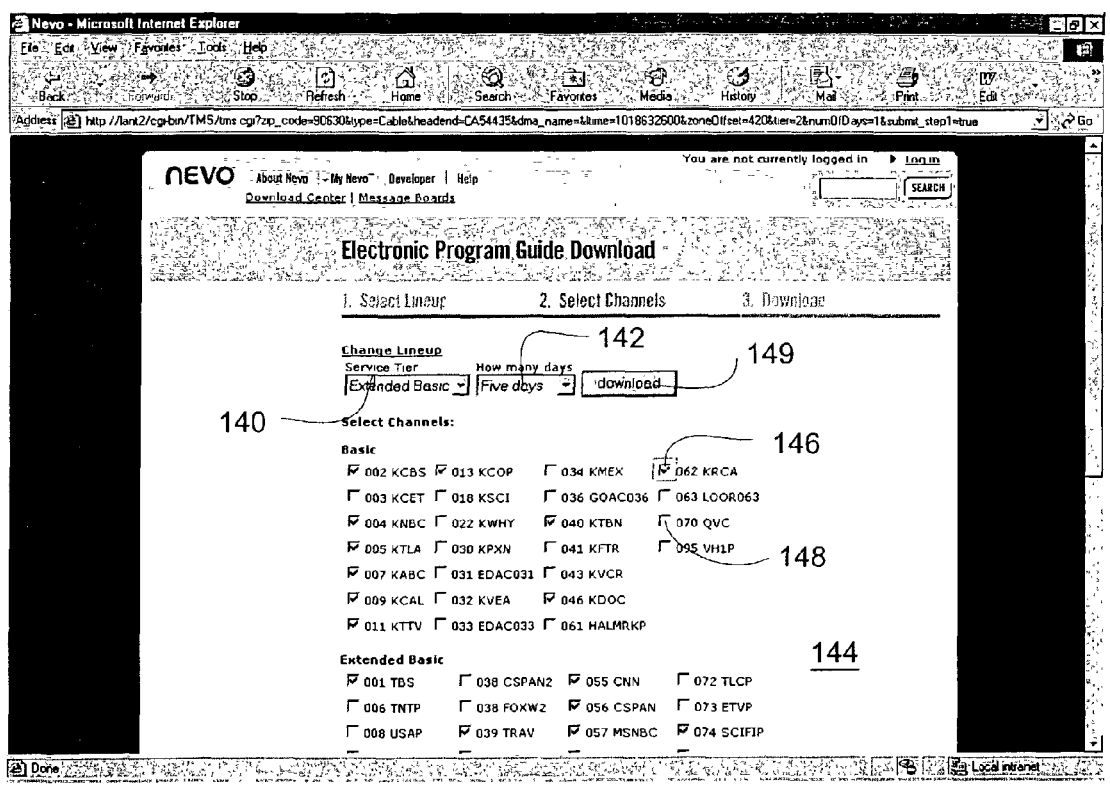

To obtain program guide information, a consumer may log onto the Web server 32 using a personal computer 34 and any standard Web browser such as, for example, Microsoft's Internet Explorer brand Web browser. The Web server 32 identifies the consumer and their preferences via a combination of log-in data stored in a registration database 46 and/or a "cookie" stored on the consumer's local hard drive. Referring to FIGS. 12-14, the first time the consumer accesses the Web server 32 they may be asked to submit information which includes a zip code 120, type of service 122 (e.g., cable, satellite, etc.), service provider 130 (e.g., DirectTV, Cox Cable, etc.) and level of service 140 (e.g., basic, extended basic, premium, etc.). Based on this data, the consumer could be presented with a complete channel line-up 144 for their particular service tier and allowed to select which channels they desire to be included in their guide display. Examples of selected and unselected channels are shown at 146 and 148, respectively, in FIG. 14.

In addition, the consumer may be requested to indicate how many days of programming information 142 the consumer wishes to download in each session. As these latter parameters are changed, an indication of the estimated size of the file to be downloaded may be displayed for the convenience of the consumer. This is particularly advantageous for consumers that have slower, dial-up communication lines with the Web server 32 in that they may determine the extent of the program guide content to download against download time.

The parameters established during this initial interaction with the Web server 32 may then be stored in the registration database/cookie and redisplayed whenever the consumer subsequently accesses the site. Thus, during subsequent visits to the Web server 32, the consumer may accept all the parameter values "as is" or make changes as desired. Certain of these parameters may also be accumulated by the Web server 32 for statistical purposes (e.g., "How may cable subscribers in Irvine California include MTV in their program guide data?"). While described in terms of a consumer manually accessing the Web server 32 using a Web browser to retrieve the guide data, once the initial preference parameters are obtained the process of downloading program guide data may be automated. For example, the consumer's computer 34 can be configured to automatically dial out via a PSTN or Internet at a fixed time every night, at some predetermined time interval, etc. to contact the Web server 32 and retrieve the guide data.

Based on the identity and preferences of a consumer, a Web server interface 44 and related data extraction programs, illustrated in FIG. 4, extract an appropriate subset of the program guide data stored in the database 42 and format this extracted data into a personal guide data file 48 for transfer to the consumer's computer 34 via the Internet 30. The transferred guide data file may include program listing information originating from the program guide data provider 40; supplemental graphics and/or advertising either associated with particular programs or free standing (originating from program graphics provider(s) 401); special channel service information 402 (originating from the service provider of other entities); etc. all of which may be individually tailored to the consumer based on their specified preferences, service type, and/or geographic location. Once located on the consumer's computer 34, the file 48 can be automatically transferred to the device 10 via the synchronization process the next time the device 10 is docked with the computer 34.

The channel guide data downloaded to the portable device 10 may include panels (individual entries), rows (horizontally across the time axis), and/or columns (vertically along the channel axis) and may include advertising or other information interspersed within or overlaying the panels. As noted, advertising or other information data may be inserted by the data extraction program of the Web server 32 based on the preferences of a consumer, the specified service type, the geographic location of the user, and/or data that the service provider desires the consumer to be exposed to. In addition, the guide display application on the portable device 10 may include the ability to lock one or more portions of the guide display to a specific set or group of data. While the locked portions may be unmovable by the consumer from a specified location within the display or may dynamically change location based on the manner that the consumer is interacting with the guide, it is preferred that the locked portion remain visible to the consumer at all times that the guide is being viewed.

Figure 15:
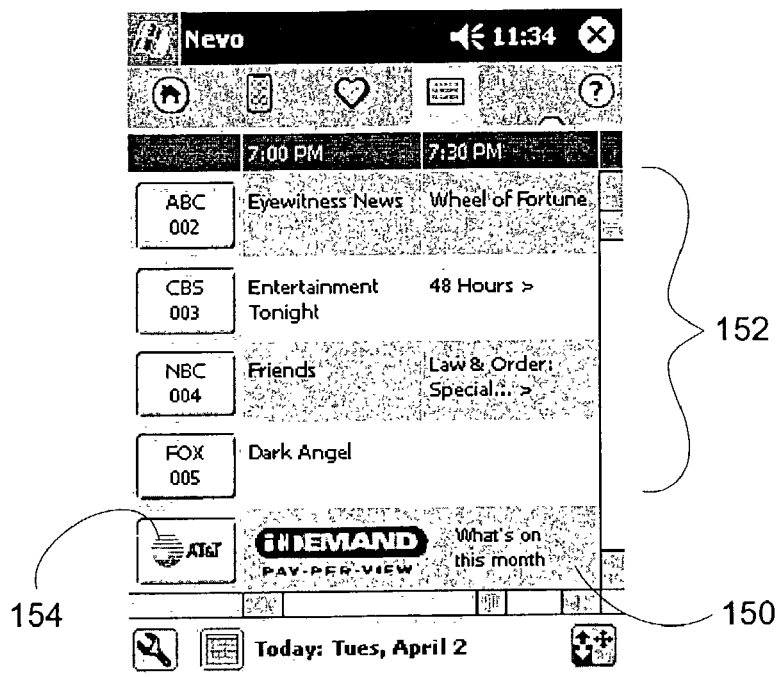
FIGS. 15 and 16 illustrate an exemplary program guide in which a portion of the guide viewing area is locked.

By way of example, referring to FIG. 15, a subscriber to AT&T's digital cable service in zip code area "90630" may receive a guide data file which includes a data block permanently assigning the bottom row 150 of the guide display to a pay-per-view channel. In this example, as the consumer scrolls through the other channel information 152 the display in area 150 remains in a fixed, visible location so that the consumer is constantly able to directly access the "In Demand" pay-per-view preview channel by touching the AT&T logo button 154 (i.e., in response to a selection of the soft key labeled "In Demand" the device 10 will be caused to transmit the commands to access the service).

Figure 16:
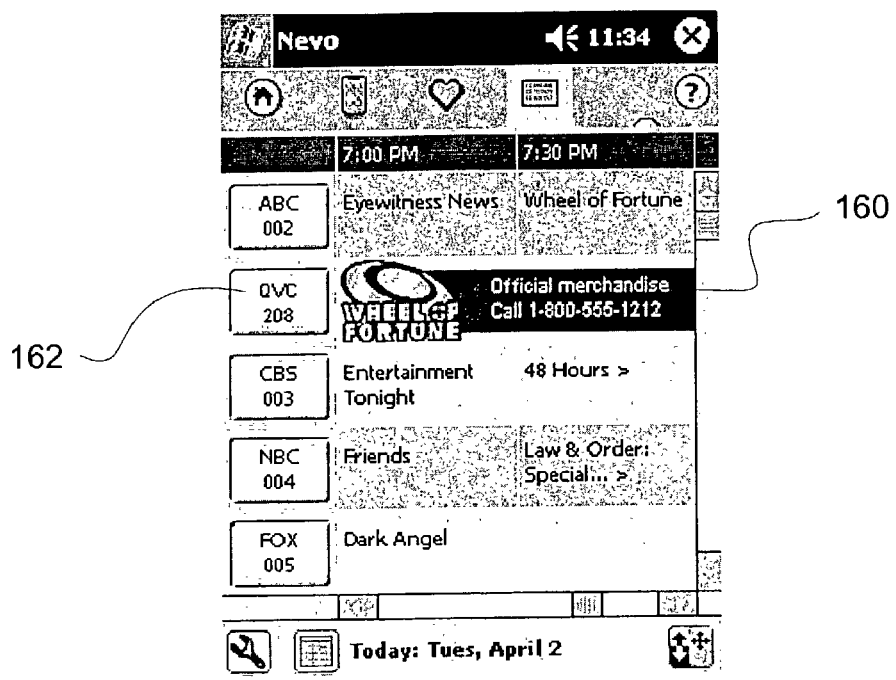

It is to be understood that the fixed portion of the guide 150 need not be used to display only channels and/or program information by may also be used to display other information, such as advertising (e.g., an MSO may place an advertisement for its service into the guide data of consumers that not note subscribe to cable). Furthermore, the content in the fixed portion 150 need not be static and may vary with time or channel. For example, within the fixed portion 150 may appear information advertising a series of specific shows or events, either upcoming or in progress, information advertising goods for sale associated with or related to a particular show or channel, etc. as illustrated in FIG. 16 (e.g., an advertisement 160 for goods associated with a particular television program that is due to air shortly is shown). Still further, this locked portion 150 may be embedded within the guide data to persist over a given time period, for example, thirty minutes before through thirty minutes after a show, or at such other time(s) as the advertiser desires. The fixed portion 150 may be associated with a button 162 to switch to a channel on which more information regarding the merchandise is available, a button to switch an appliance to some other channel, or the button 162 may be omitted all together.

Figure 5:
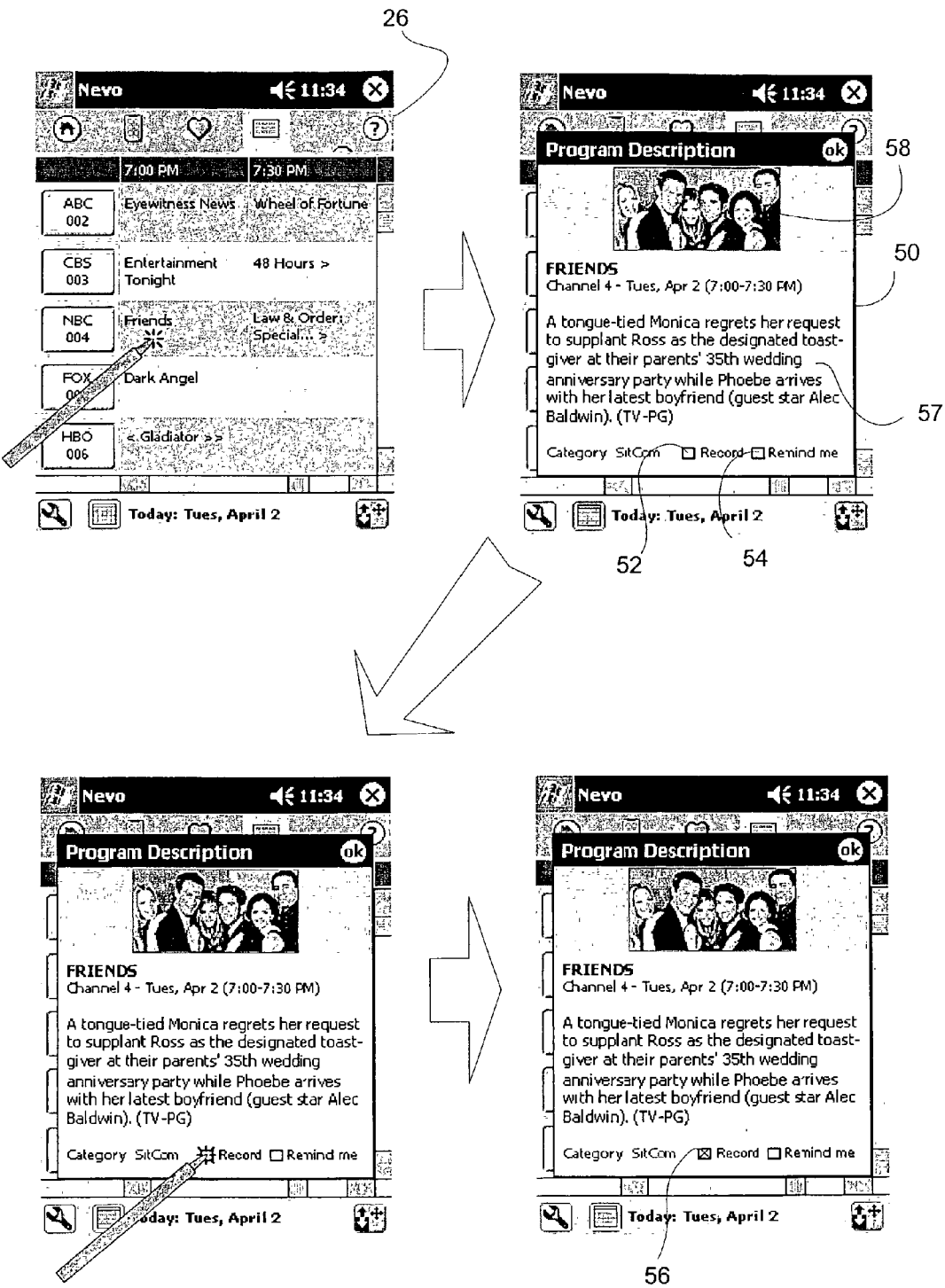
FIG. 5 illustrates exemplary screen shots of a graphical user interface of the portable device of FIG. 1 specifically illustrating interaction with the downloaded program guide information to effect automatic program recording.
Figure 6:
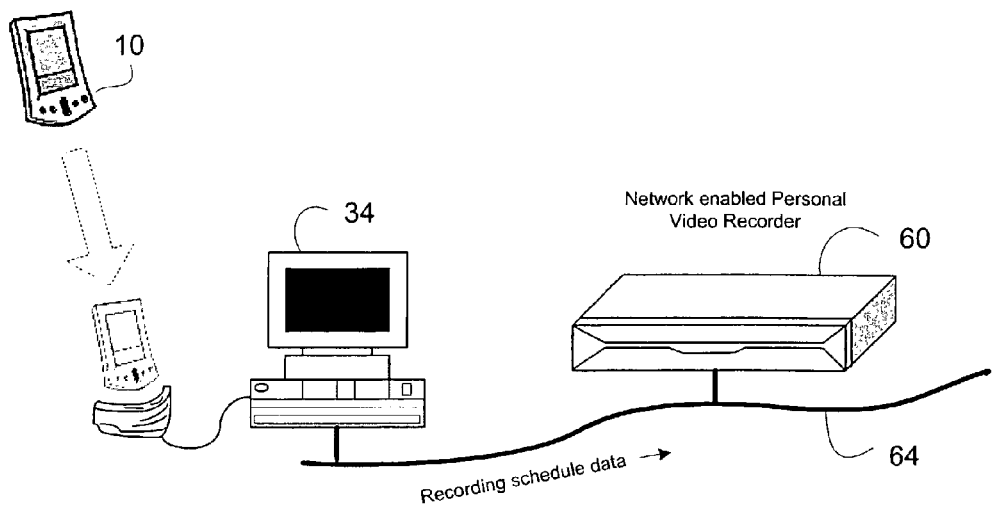
FIGS. 6-11 illustrate exemplary networks by which the portable device of FIG. 1 can be used to automatically enable the recording function of a home appliance.

Turning now to FIG. 5, the program guide display 26 is preferably configured such that, if the consumer touches a particular guide listing, e.g., "Friends," a pop-up window 50 displays additional information regarding the program. The pop-up window 50 may include extended information 57 regarding the program and, in some embodiments, may include supplemental graphics 58 which originated from sources (401, 402) other than the provider of the raw guide data 40. The pop-up window 50 may also include check boxes, or other conventional graphical user interface elements such as menus, etc., to accept user input. For example, the illustrative embodiment includes check box 52 and check box 54 which can be selected using conventional GUI techniques. In the illustrative example, the check boxes may be selected to allow the consumer to either tag the program event for future recording or to create a reminder entry it in a calendar application resident of the device 10 and/or computer 34.

By way of example, touching the "Record" check box 52 causes the data regarding this program event (time, channel, duration, etc.) to be entered into a recording schedule data file 62 (shown in FIG. 3) located within the device 10. To confirm the acceptance of the recording request in the data file 63, the appearance of the check box 52 may be caused to change 56. The device 10 may also perform conflict resolution (e.g., to determine if there are any overlapping requests) interactively at this level, or may simply store all requests for later resolution by the recoding device. It will also be appreciated that the data regarding the program event may be stored as described above (date, time, channel) using one or more compressed forms, as pointers into guide database entries in the event the target recording device and the portable device 10 use a common data source for guide information, etc. It is also desired to allow the consumer to remove recording request data from the file for example, by returning to a program listing and un-checking the box 52.

In certain embodiments, multiple recording devices may be supported via multiple recording schedule data files. In this event, the device 10 may be configured to default to a particular device (and its corresponding file) unless specified otherwise by the consumer. To this end, additional check boxes, a pull-down menu, or the like may be provided by which the consumer can specify an intended target device. Thus, while the discussions herein have assumed a single set of recording schedule data, those of skill in the art will appreciated how to easily modify the teachings herein so that multiple devices are supported via additional instances of the data set.

Returning now to FIG. 3, the consumer's computer 34 may also connected to a home network 64 which may be wired or wireless. In such a case, also attached to the home network would be a network-enabled appliance, for example, a ReplayTV 4000 brand personal video recorder ("PVR") from Sonicblue Inc. When the portable device 10 is docked with the computer 34 for file synchronization, not only is any updated guide data 48 transferred from the computer 34 to the device 10, but the contents of the recording schedule request file 62 could be transferred from the device 10 to the computer 34. The recording request data 62 can then be transferred from the computer 34 to the PVR 60 via the home network 64. In this manner, a consumer may browse a device-based program guide and enter recording requests wherever the consumer happens to be located and these requests will be logged and automatically transferred to the recording device at a later time.

Figure 7:
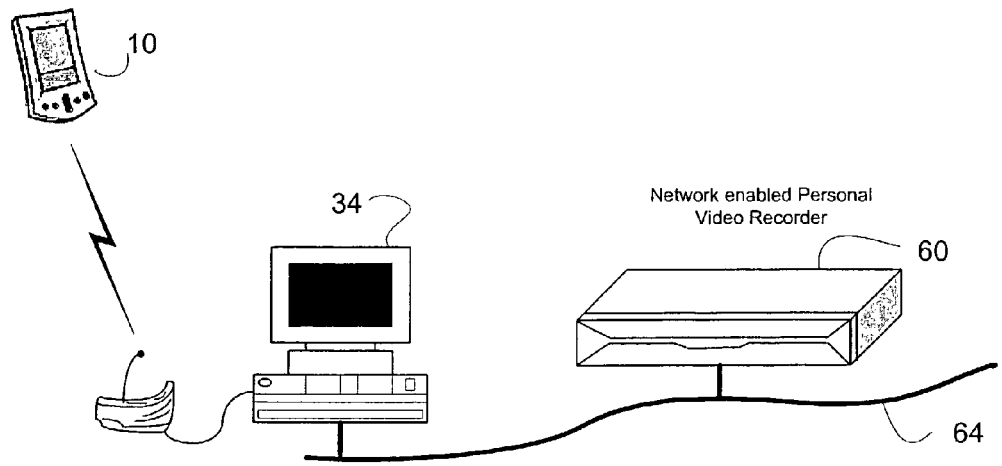
Figure 8:
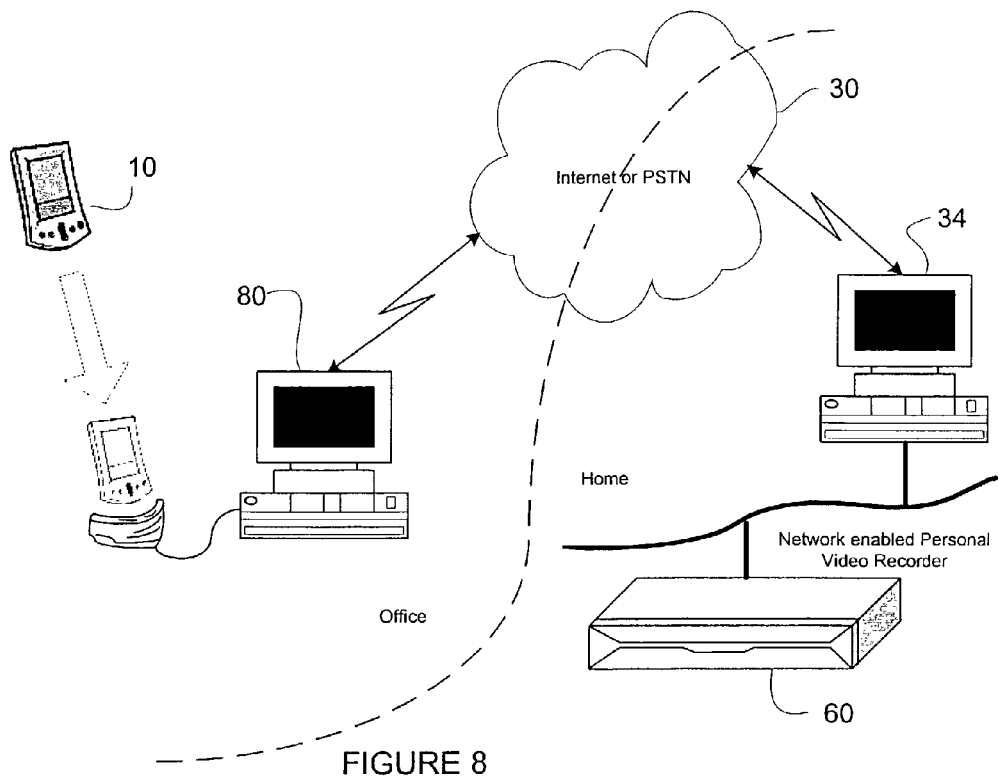
Figure 9:
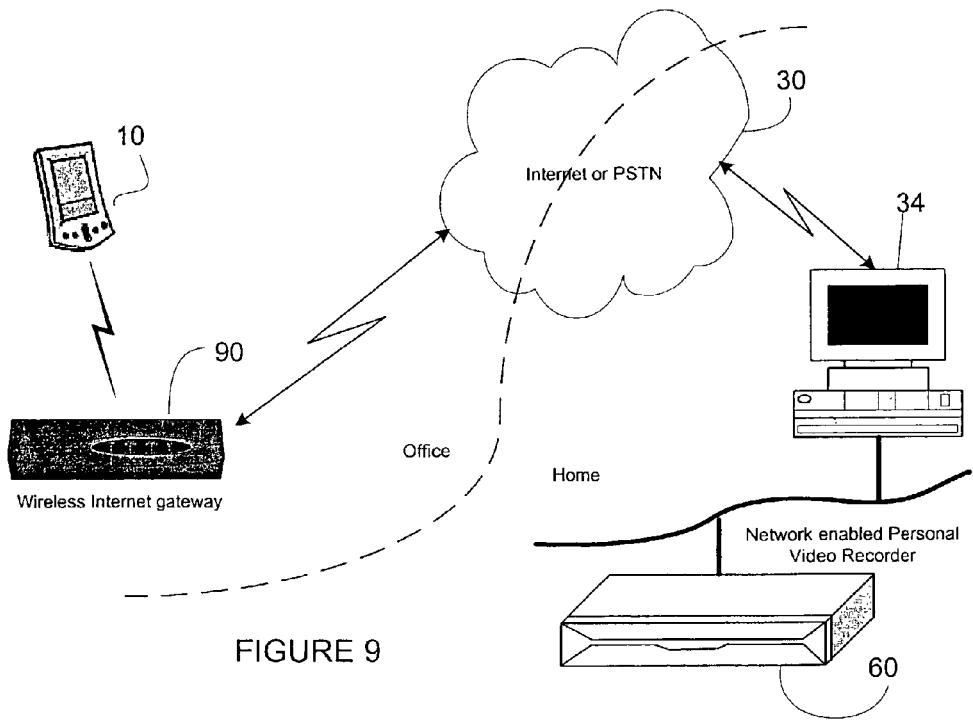
Figure 10:
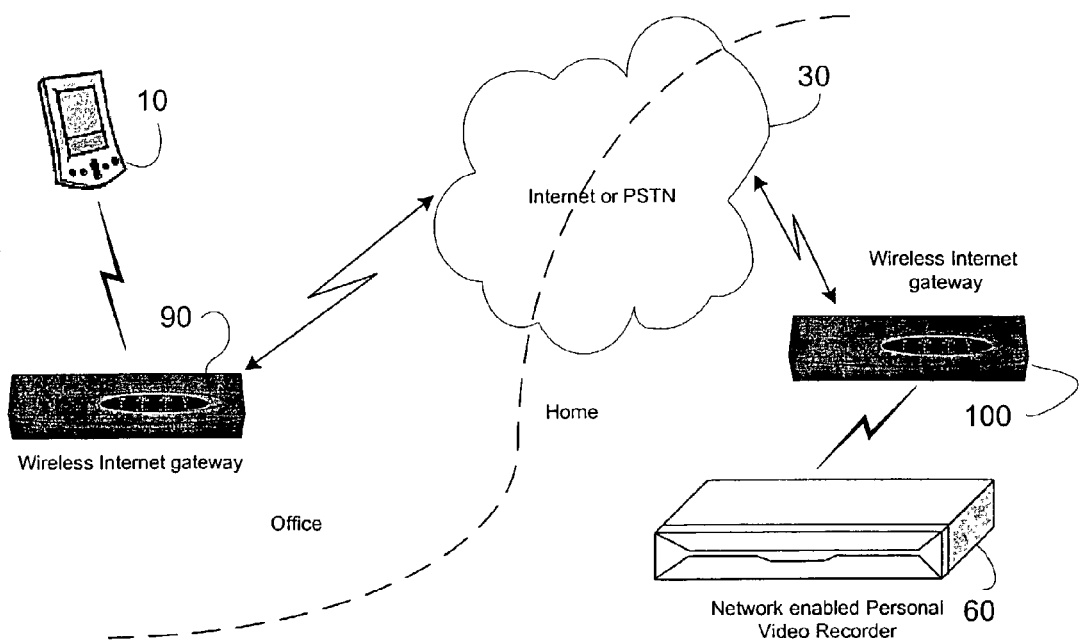
Figure 11:
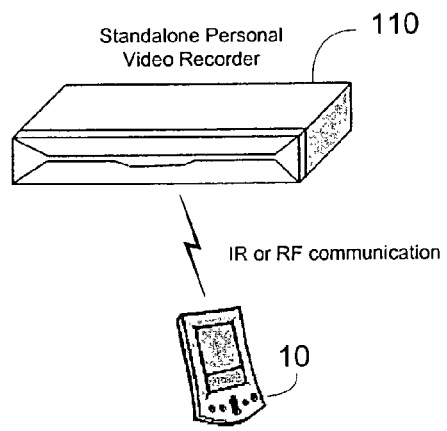

FIGS. 7 through 11 show alternative embodiments of networks employing this principle. In FIG. 7, the device 10 is in wireless communication with the computer 34, for example, as part of a Bluetooth personal area network where the device 10 becomes active when brought into the house. Such a configuration is also possible using IEEE 802.11 technology. FIG. 8 shows how the device 10 may be docked at a remote computer 80 (e.g. in the consumer's office) which acquires the recording schedule request data and transfers it via the Internet 30 to the consumer's home computer 34 where it is processed as described previously. FIG. 9 shows a similar arrangement except that in this case the office system includes a wireless Internet gateway device 90 which is used by the device 10 to directly transfer the recording schedule request data to the Internet 30 and thereby to the computer 34. FIG. 10 shows an arrangement similar to FIG. 9 except in this case both ends are equipped with wireless Internet gateways and the device 10 transfers the recording schedule request data directly to the recording device. Still further, FIG. 11 shows a system in which a recording device 110 is not network capable. In this case, the device 10 transfers the recording schedule request data directly to the recording device 110 when it is brought into proximity to the recording device 110, using either infrared or RF wireless communication. Transfer in this case may be manually initiated by the consumer, triggered automatically (for example, by the device 10 sensing it has been brought into range of a Bluetooth personal area network of which the recording device 110 is also a member), may be automatically initiated at a user-selected fixed time each day, etc.

Turning to FIGS. 17-23, a further system and method for use in automatically updating a calendar application 1900 running on the device 10 is illustrated. While not required, the system and method described hereinafter may be utilized to allow a consumer to update the calendar application 1900 with information that is targeted to the consumer based on consumer preferences, geography, etc. Alternatively, information that may be used to update the calendar application 1900 can be provided in a uniform manner to consumers without regard to any preferences or profiling.

In keeping with exemplary systems and methods described previously, a consumer may access a Web server 32 via the Internet 30 for example, to access a program guide database, to access a remote control application set-up facility, etc. (see for example U.S. Application Ser. Nos. 60/371,223, 60/374,556 and 60/372,874 that are incorporated herein by reference in their entirety). In at least the case of a Web server 32 having an associated program guide database, access would be expected to be reoccurring for the purpose of refreshing the information maintained within the device 10. Furthermore, it is anticipated that the consumer would register with the Web server 32 (either upon initial access or as necessary) before being provided with access to the one or more services offered via the Web server 32. During such a registration process, the Web server 32 preferably collects consumer preference and other demographic information. Still further, when used to access program guide information, the consumer would typically inform the Web server 32 of the service type and channels of interest for which information is to be downloaded. Accordingly, it is possible for the Web server 32 to use any captured information to suggest items to the user, related to upcoming programming, events, etc. which might be deemed to be of interest to the consumer. The consumer may then download into the calendar application 1900 reminder items that are representative of the information set forth in such advertising.

Figure 17:
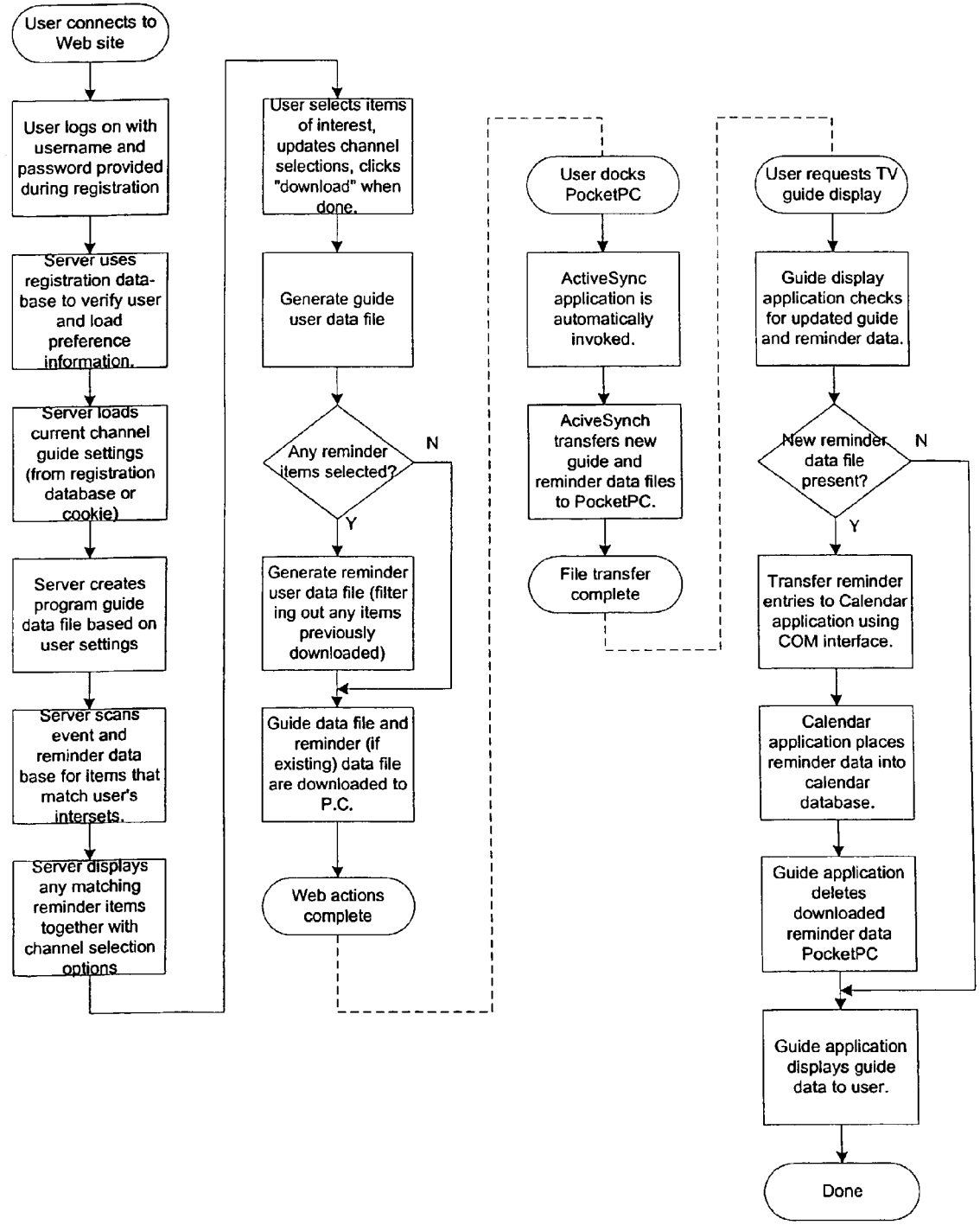
FIG. 17 illustrates exemplary steps for updating a calendar application.
Figure 18:
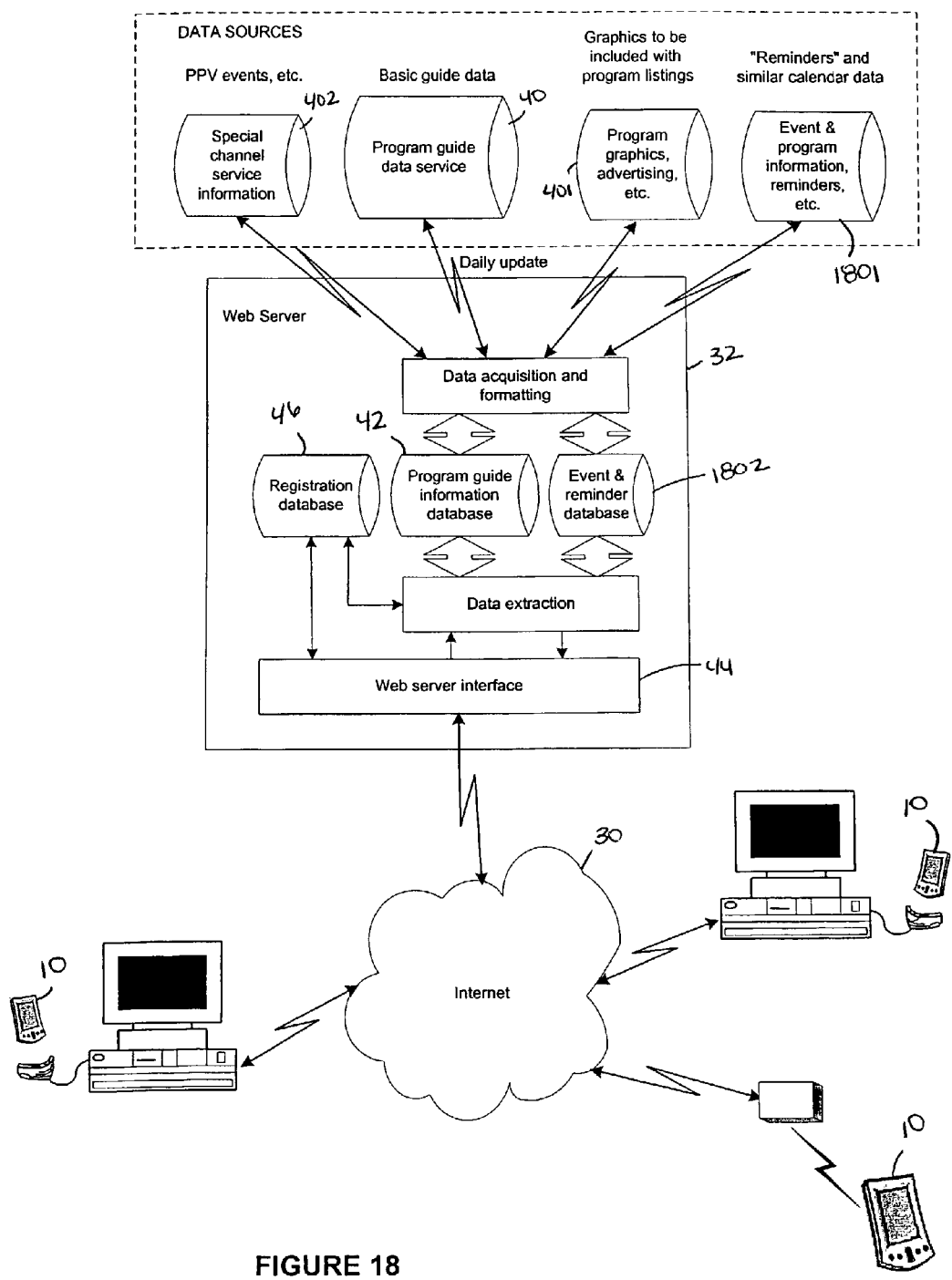
FIGS. 18 and 19 illustrate an exemplary network for use in updating a calendar application.

Turning to FIGS. 17 and 18, an exemplary process for updating the calendar application 1900 is illustrated. In the example, a consumer accesses the Web server 32 having an associated event and reminder database 1802. As noted, the consumer may be required to log-in (if previously registered) or register with the Web server 32 to gain access to the services offered by the Web server 32. Once the consumer has accessed the Web server 32, the consumer may navigate the Web server 32 to gain access to one or more services, informational pages, etc. supported by the Web server 32. During this navigation, the user may also be presented with informational advertisements 2000 (examples of which are illustrated in FIG. 20) with which the user can interact to request that information related to the displayed advertisement be eventually downloaded to the calendar application 1900 as reminders.

Figure 20:
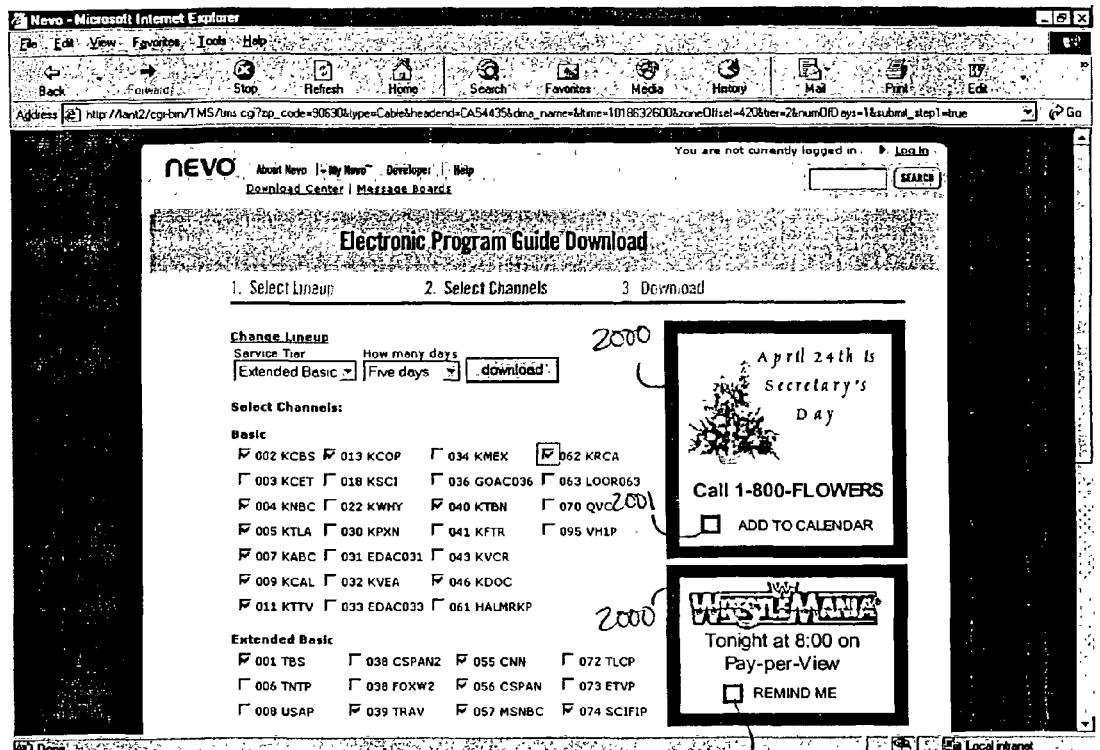
FIG. 20 illustrates an exemplary screen shot of a Web page having advertising information which may be selected for use in populating the calendar application with reminder information.

By way of further example, the informational advertisements 2000 can be presented in a separate Window or as integrated parts of a displayed Web page, such as the "Electronic Program Guide Download" page illustrated in FIG. 20. In this illustrated example, a Web server application, using the registration and preference information (e.g., derived from server-based and/or "cookie" data), shows the current program guide configuration for the consumer as well as a targeted informational advertisement 2000 for "Wrestlemania." The user is also presented with a non-targeted informational advertisement 2000 related to "Secretary's Day." As evidenced by the example illustrated, the information advertisements 2000 can be programming related (e.g., promoting a pay-per-view event) or may be date/event related (e.g., promoting Mother's day services).

The informational advertisements may be maintained in a database local to the Web server 32 or may be accessible from a remote database repository 1801. It is contemplated that these databases can be populated by the operator of the Web server 32 or by third parties, for example, by way of an agreement. Preferably, stored informational advertisement information has criteria information associated therewith which is used to match informational advertisements with consumers using the consumer preferences in the case where targeting advertising is desired. To this end, when advertising is offered by third parties, the host of the Web server services may provide predefined criteria information which the third party can check off for use in directing advertisements to targeted consumers. Alternatively, an application can be used to parse an advertisement to find keywords that are usable in the matching function.

For use in indicating a desire to download a reminder concerning a displayed advertisement 2000, the consumer can be provided with a graphical user interface element 2001 with which to interact. The graphical user interface element 2001 may be in the form of a check-box, pull-down menu, or the like without limitation. In response to the user selecting an advertisement as being of interest, the Web server application creates customized file(s) that contain reminder data indicative of the information in the advertisement 2000.

Figure 21:
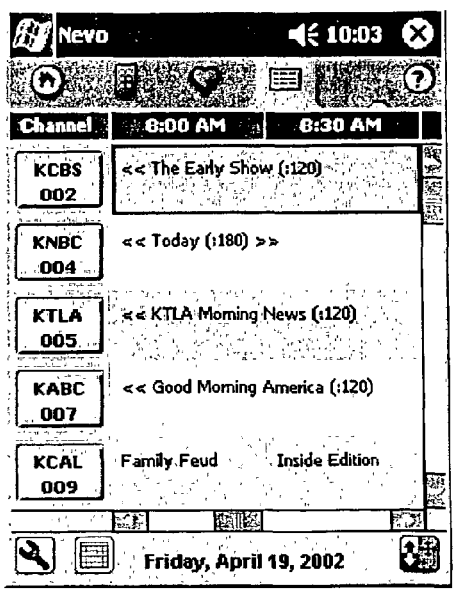
FIG. 21 illustrates an exemplary electronic program guide resulting from interaction with the Web page of FIG. 20.

It is also contemplated that, the customized file(s) may also contain program guide data useful for presenting an electronic program guide on the device 10. In this case, the user may interact with a Web page to select programming of interest, as illustrated in FIG. 20, which, after the customized file(s) are synchronized with the device 10, is also used to populate the electronic program guide as illustrated in FIG. 21. To this end, it will be understood that the program guide application and the calendar application may be integrated into a single application.

Figure 19:
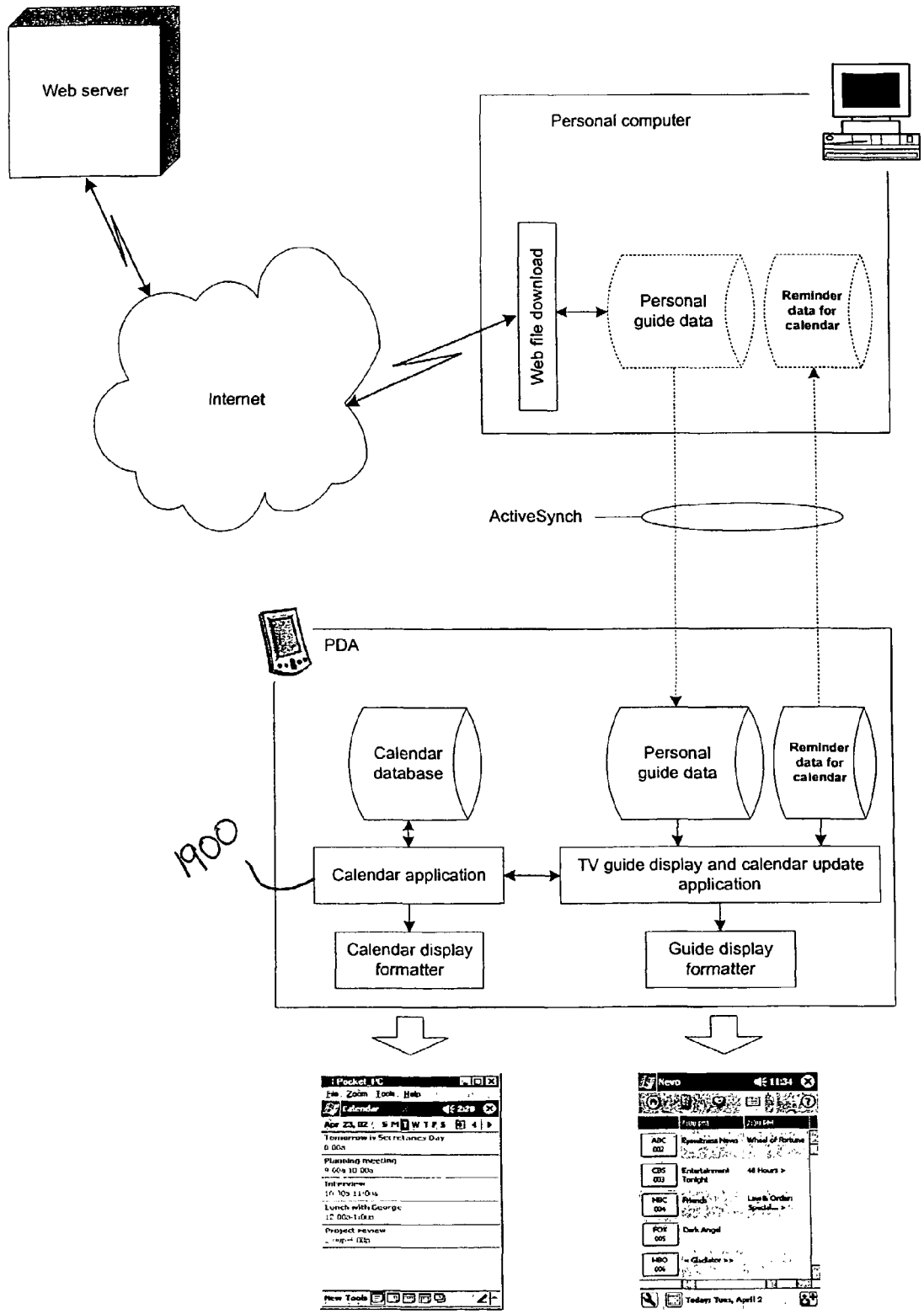

As discussed previously, customized file(s) created by the Web server 32 may be downloaded to an intermediate computer 34 or directly to the device 10 itself. More specifically, the downloaded customized file(s) are preferably placed in a specific memory location on the receiving device and then automatically synchronized to the device 10. By way of example, this memory location may be in the directory "My Documents\Pocket_PC My Documents" in devices using Microsoft's PocketPC brand software. Thus, as illustrated in FIG. 19, when the user next docks the device with an intermediate computer 34, or simulates docking if the device 10 itself is used as the download station, the customized file(s) generated by the Web server are transferred to the corresponding directory on the device 10 as a result of the execution of an ActiveSynch application or the like.

Once the devices have been synchronized, every time the program guide application and/or the calendar application are entered on the device 10, the application(s) check for any files newly delivered via the synchronization process. If an updated data file is found, an update application is used to replace any existing program guide data files and/or calendar reminder files with the newly downloaded data. After the files have been successfully transferred, the synchronization files are preferably deleted. While the program guide data and reminder data have been illustrated as being separate files, it will be appreciated that the data may be consolidated into a single data structure if desired.

Figure 22:
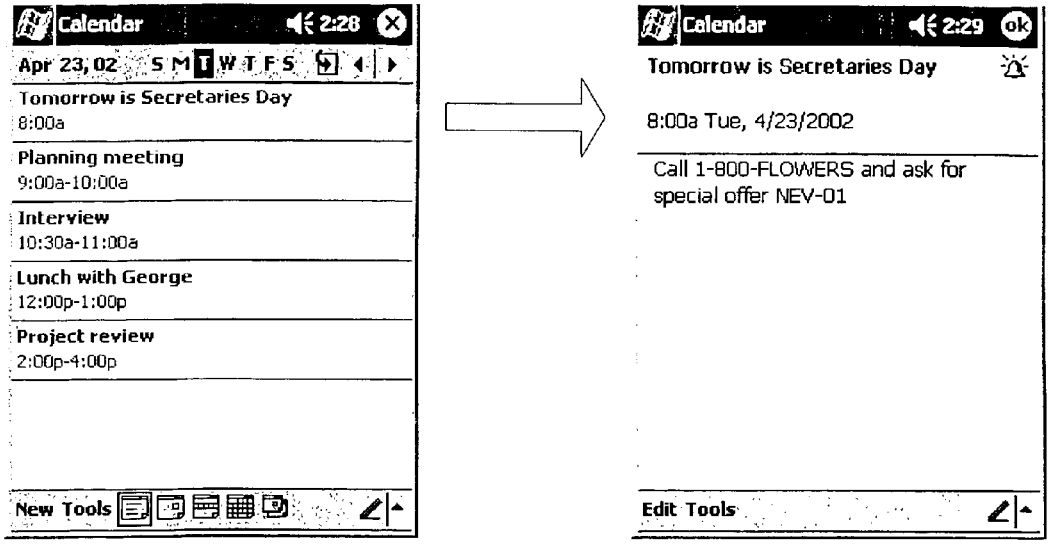
FIGS. 22 and 23 illustrate an exemplary electronic calendar resulting from interaction with the Web page of FIG. 20.
Figure 23:
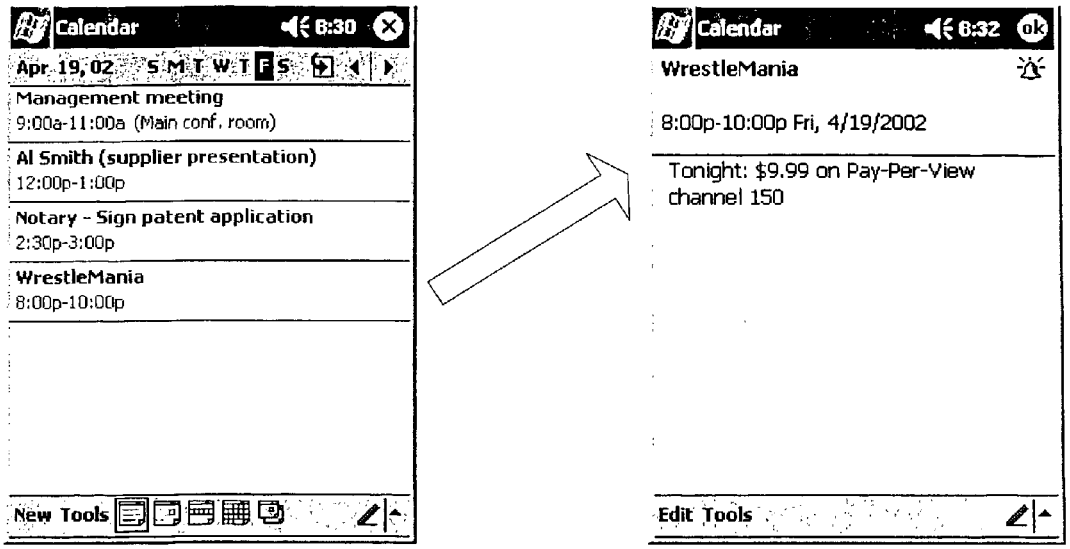
Figure 24:
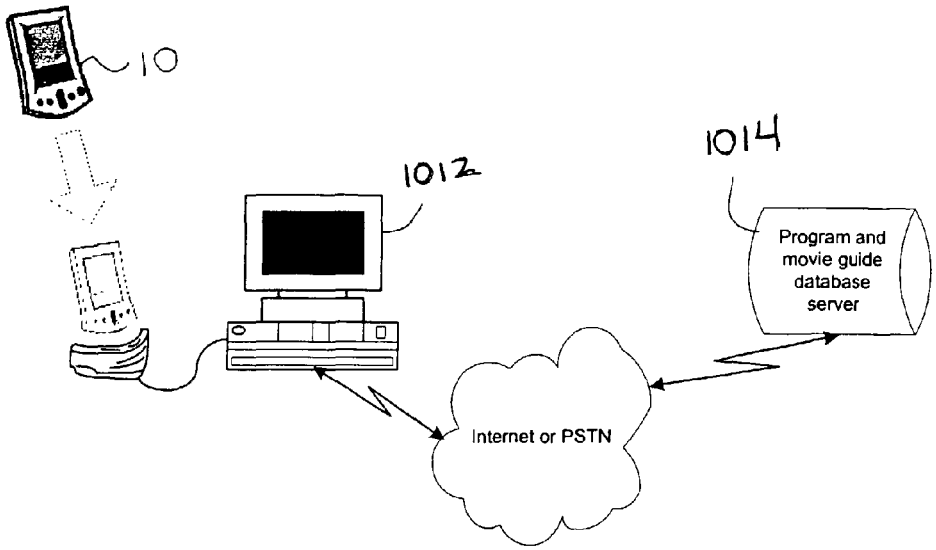
FIGS. 24 illustrates an exemplary network by which the electronic calendar may be populated with movie information.

When the calendar application is then invoked the downloaded reminder information is available to the consumer. As illustrated in FIGS. 22 and 23, the consumer may be first presented with general information concerning a program or an event. The consumer may then select a general information entry, using conventional GUI techniques, to obtain access to more specific information concerning a program or event of interest. Alternatively, in an instance where the calendar application and the guide application are integrated, it will be appreciated that any reminder data can be displayed to the consumer, for example, in the fixed portion 150 of the guide or some other portion of the display screen that is assigned for that purpose.

In a further embodiment, illustrated in FIGS. 24-29, to populate the electronic calendar application with information by which a consumer may be reminded of upcoming events, e.g., movies, performances, etc., a consumer may log on to a Web server 1014 via a gateway 1012 or the like to access and download information, hereinafter referred to generally as movie guide information, that is maintained on a database associated with the Web server 1014. At this time, the consumer may also obtain any TV guide information as described above. It will be appreciated that data for populating the Web server 1014 with movie guide information is also commercially available from sources such as TMS, indexed by geographical location (e.g., zip code). In further keeping with the description set forth above, any downloaded guide information (movie and/or TV) may be transferred to the device 10 the next time the device 10 is docked with the gateway 1012. As before, alternative methods for getting the guide information into the device 10 may be used such as, for example, placing the device 10 in direct wireless communication with the Internet without using an intermediate gateway 1012 to which the device 10 is docked.

Figure 25:
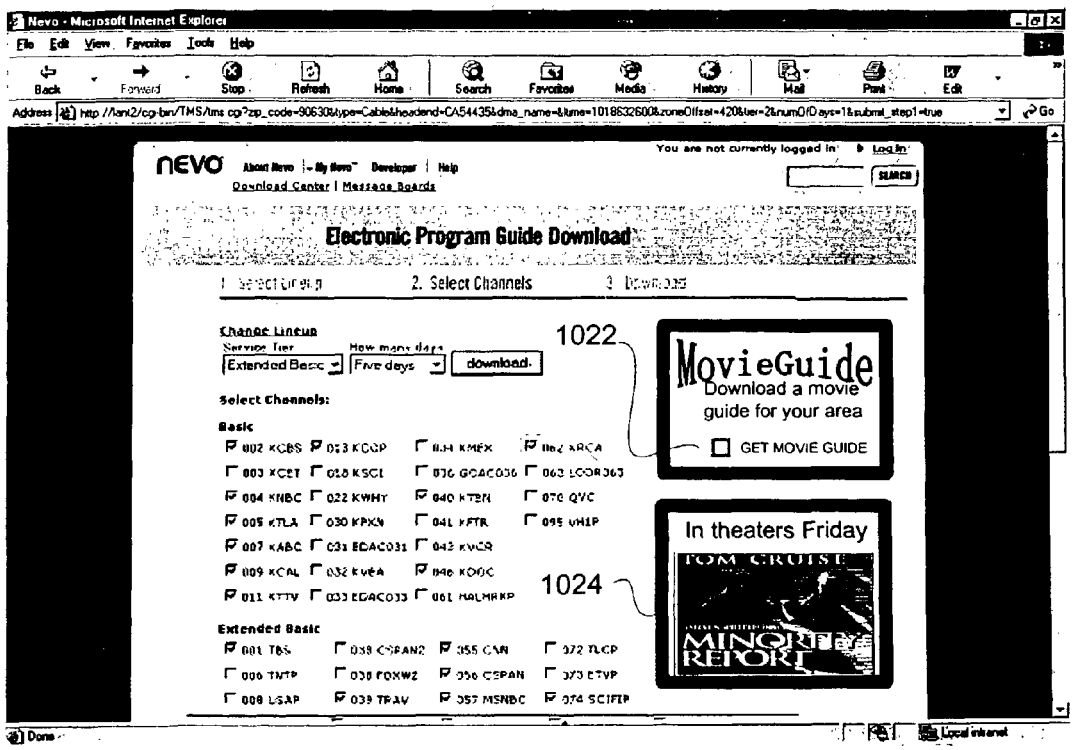
FIGS. 25-29 illustrate screen shots of an exemplary graphical user interface by which movie information may be used to populate the electronic calendar.

For providing a means by which the consumer may request the downloading of movie guide information and/or TV guide information, the Web server 1014 may present to the consumer the exemplary Web page illustrated in FIG. 25. In the example illustrated, the consumer may request TV guide information in the manner described previously and also indicate a desire to receive movie guide information, for example, by checking box 1022. In connection with the displayed page, the Web server 1014 may also offer movie-related advertising as illustrated in box 1024 which may offer the ability to have the advertising entered into the calendar application. As will be understood, the advertising may be in the form of an additional pop-up window, a script, or included as part of the Web page without limitation. The movie guide data that is to be downloaded to the device 10 is preferably determined by the zip-code of the consumer, which the consumer may have previously supplied to the server as part of the TV guide configuration process.

Once the movie guide data is transferred to the device 10, the data may be accessed and presented to the consumer as illustrated in the exemplary movie guide shown in FIGS. 26-29. In this regard, the consumer may select an icon 1031, e.g., an icon with the appearance of a film reel, from the row of icons presented to the user across the top of the display screen (the other tabs perform various remote control and TV guide function described elsewhere) the selection of which results in a movie guide appearing in the display 1030. In the illustrated example, the movie guide is arranged in a grid so that each row corresponds to one local theater. The first entry in the row is the name of the theater. The second entry 1032 in the row is a general location for that theater. Subsequent entries in a row represent movies 1042 currently playing at that theater complex. The movie entries 1042 may also include show times. Although movie entries in the illustrated example are shown presented in simple alphabetical order, it will be appreciated that provision can be made to allow the user to change the order of and/or filter the displayed movie listings according to personal preferences such as genre, rating, actors, times, etc.

Alternatively, the grid can be arranged such that the first entry in a row (e.g., a cell within the left most column) is the movie entry and subsequent entries in a row can be theaters in which the movie appears. The theater entries may also list show times, theater location, etc. In this grid arrangement, the listing of movie guide information can be similarly filtered according to personal preferences such as genre, rating, actors, etc. Additionally, a toggle command button might be utilized to allow the consumer to toggle between the listing in which theaters are the primary entry in the grid (i.e., theaters followed by movies entries) and the listing in which movie entries are the primary entry in the grid (i.e., movies followed by theater entries). Still further, alternative display formats may be a consumer-configurable option as part of a display preferences set up.

To navigate within the displayed movie guide, the movie guide may be provided with scroll bars 1035V and 1035H. The scroll bar 1035V may be used to change the rows that are displayed and the scroll bar 1035H may be used to change the columns that are displayed. The scroll bars also provide an indication as to the relative position of the displayed portion of the grid with respect to the entirety of the grid (see the scroll bar 1035H in FIG. 27, for example, in which a middle column "Movie 4" is positioned in the display and the scroll bar 1035H illustrates a middle positioning). Preferably, when using the scroll bar 1035H to scroll through columns, the primary column (e.g., the column that lists theaters if subsequent entries contain movie entries) remains visible to the user. In addition, when using the scroll bars to change the grid cells to be displayed, the displayed grid may remain static until such time as the scroll bars are released after which the display of the grid is changed to fit the positioning of the scroll bars. In this case, a text message may be displayed that changes as the position of the scroll bar changes to reflect which row or column would be displayed if interaction with the scroll bar were to cease at that point. This is in the same manner as information is displayed while scrolling the electronic program guide described in U.S. patent application 60/371,223. In the examples illustrated in FIGS. 26 and 27, movement of the scroll bar 1035H from the position illustrated in FIG. 26 to the position illustrated in FIG. 27 would cause text messages "Movie 1" through "Movie 4" to appear adjacent the scroll bar until the user released the scroll bar in the position illustrated in FIG. 27 in which the displayed grid commences at column "Movie 4."

Figure 26:
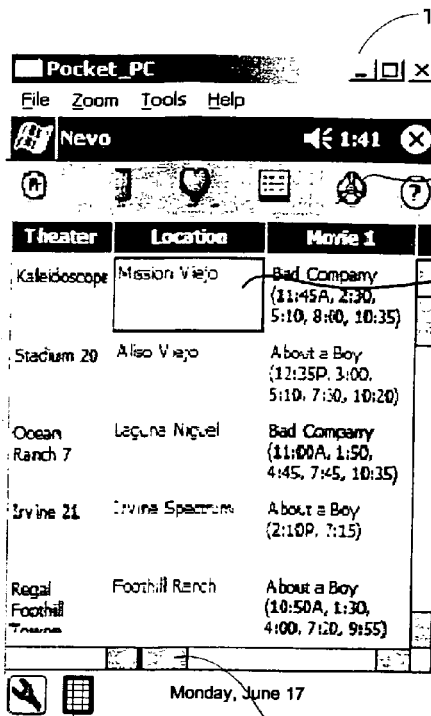
Figure 27:
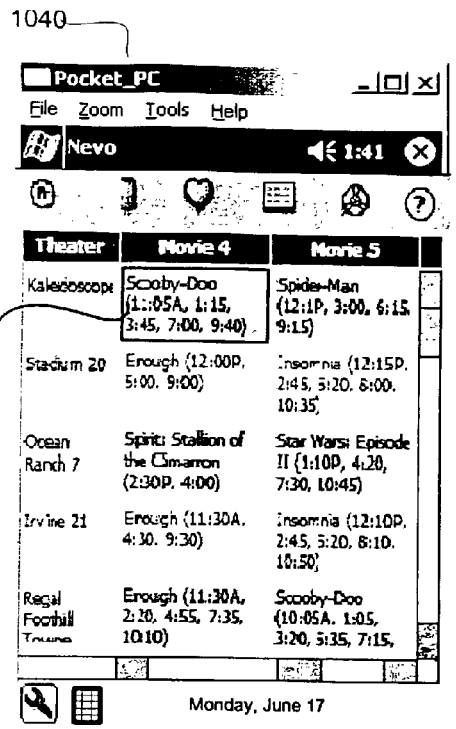
Figure 28:
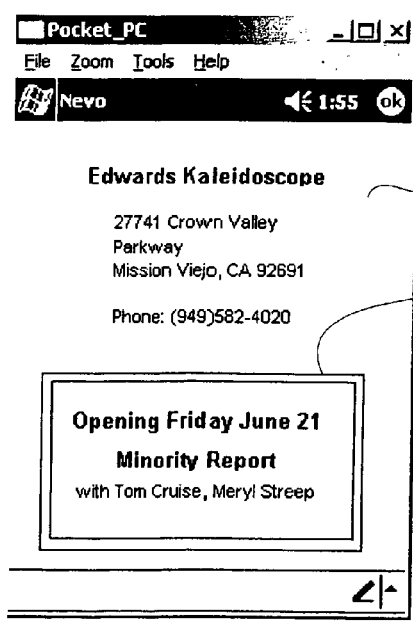

Within the movie guide, information is presented through the course of a given day, illustrated in the examples as "Monday June 17." While the default day for displaying data is the current day, this may be changed by sliding the bottom scroll bar 1035H all the way to the right which will increment the movie grid by one day (while also resetting the scroll bar 1035H to the left most configuration illustrated in FIG. 26). Alternatively, data for a selected day may be displayed by clicking on the calendar icon 1034 to directly select a future day.

Figure 29:
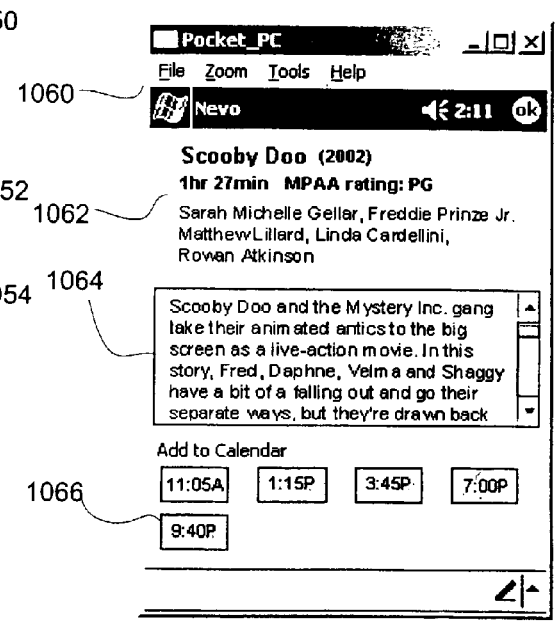

To further illustrate an exemplary operation of the movie guide, the movie guide may provide for selecting a "theater" or "location" entry 1032 to cause display of an expanded display 1050 giving detailed address and telephone information 1052 regarding that particular theater. As can be seen at 1054, the expanded display 1050 may also include promotional material specific to that theater or theater chain. Similarly, when the consumer sees a movie entry of interest, selecting that entry, for example "Scooby Doo" 1042, results in the display 1060 of detailed information regarding that movie as illustrated in FIG. 29. The movie information may include general information 1062 regarding duration, rating, names of artists, etc., as well as a brief synopsis of the movie 1064. The displayed screen may also includes a series of buttons 1066 by which the user may transfer the details of a specific movie showing to the calendar database. This transfer may be performed in the same manner as described with respect to entering TV guide data into the calendar database. In this regard, the software simply communicates an internal request to the calendar application (using the Microsoft COM interface) to add the reminder information to the calendar database stored in the device 10. It will be appreciated that the movie information could also be viewed, and portions thereof selected for downloading, directly from Web pages associated with the Web server in which case a customized file would be created and downloaded with the movie data and the calendar application updated via the process described above.

To alert a user of any stored reminder information, the standard functionality of the calendar application can be used. This functionality typically causes the calendar application to issue a visual and/or audible reminder at some predetermined time prior to the event that is the subject of the reminder. Typically, the consumer can set this predetermined time period.

While specific embodiments of the invention have been described in detail, it will be appreciated by those skilled in the art that various modifications and alternatives to those details could be developed in light of the overall teachings of the disclosure. For example, it will be appreciated that while a PVR was utilized in the illustrative example set forth above, in fact any appliance capable of recording program material, including the computer itself, may be scheduled in this manner. Accordingly, the particular arrangement disclosed is meant to be illustrative only and not limiting as to the scope of the invention which is to be given the full breadth of the appended claims and any equivalents thereof. All of the references cited herein are hereby incorporated by reference in their entirety.

What is claimed is:

1. A system for updating an electronic calendar, comprising:
   a Web server; and a portable electronic device having an electronic calendar application capable of communicating with the we server is a network;

wherein the Web server is adapted to cause a display of a Web page including advertising and a graphical user interface element associated with the advertising by winch a user can request that reminder item data related to the advertising within the currently displayed Web page be downloaded from the Web server to the portable electronic device for use in the electronic calendar application and wherein the Web server responds to a user interaction with the graphical user interface element associated with the advertising to download the reminder item data related to the advertising from the Web server to the portable electronic device.

2. The system as recited in claim 1, wherein the portable electronic device includes circuitry for communicating directly with the Web server via the network.

3. The system as recited in claim 1, further comprising an intermediate device adapted for direct communication with the Web server via the network and adapted to communicate with the portable electronic device via a docking station.

4. The system as recited in claim 1, wherein the advertising is displayed in connection with information related to programming, the portable electronic device has an electronic program guide, and data related to programming information is downloadable for use in the electronic program guide.

5. A method for downloading information from a Web server, comprising:

displaying to a user via a Web site a Web page including advertising and a graphical user interface element associated with the advertising;

accepting first input from the use via the graphical user interface associated with the advertising wherein the first input is indicative of a request to download from the Web site for use in a portable electronic device data related to the advertising within the currently displayed Web page; and in response to the first input, creating a first file containing the data related to the advertising within the currently displayed Web page, the data being adapted for use in an electronic calendar application hosted on the portable electronic device and downloading the first file from the Web server to a client device.

6. The method as recited in claim 5, further comprising:

displaying to the user via the We site in the Web page programming information and one or more graphical user interface elements associated with the programming information;

accepting second input from the user via the one or more graphical user interface elements associated with the programming wherein the second input is indicative of a request to download from the Web server for use in the portable electronic device data related to the programming information within the currently displayed Web page; and in response to the second inn creating a second file containing the data related to the programming information within the currently displayed Web page, the data being adapted for use in an electronic program guide application hosted on the portable electronic device and downloading the second file from the Web server to a client device.

7. The method as recited in claim 5, further comprising collecting profile information from the user and using the profile information to select targeted advertising for display to the user.

8. The method as recited in claim 7, wherein the advertising pertains to an event.

9. The method as recited in claim 7, wherein the advertising pertains to programming.

* * * * *

UNITED STATES PATENT AND TRADEMARK OFFICE
CERTIFICATE OF CORRECTION

PATENT NO.        : 8,063,923 B2
APPLICATION NO.   : 10/287337
DATED             : November 22, 2011
INVENTOR(S)       : Robert P. Lilleness, Steve LanPing Huang and Patrick H. Hayes It is certified that error appears in the above-identified patent and that said Letters Patent is hereby corrected as shown below:

Column 13, line 2, claim 1:   delete "we" and add --web--

Column 13, line 3, claim 1:   delete "is" and add --via--

Column 13, line 7, claim 1:   delete "winch" and add --which--

Column 13, line 33, claim 5:  delete "use" before the word "via" and add --user--

Column 14, line 11, claim 6:  delete the word "We" before the word "site" and add --Web--

Column 14, line 22, claim 6:  delete the word "inn" and add --input--

Signed and Sealed this
Twenty-eighth Day of August, 2012

David J. Kappos
*Director of the United States Patent and Trademark Office*